No. 616,333. Patented Dec. 20, 1898.
A. HOWARD.
MECHANICAL MOVEMENT.
(Application filed June 13, 1898.)
(No Model.) 2 Sheets—Sheet 1.

Witnesses. Inventor.
J. M. Fowler Jr. Augustus Howard,
Walter B. Payne. by Henry H. Bates,
atty.

No. 616,333. Patented Dec. 20, 1898.
A. HOWARD.
MECHANICAL MOVEMENT.
(Application filed June 13, 1898.)
(No Model.) 2 Sheets—Sheet 2.
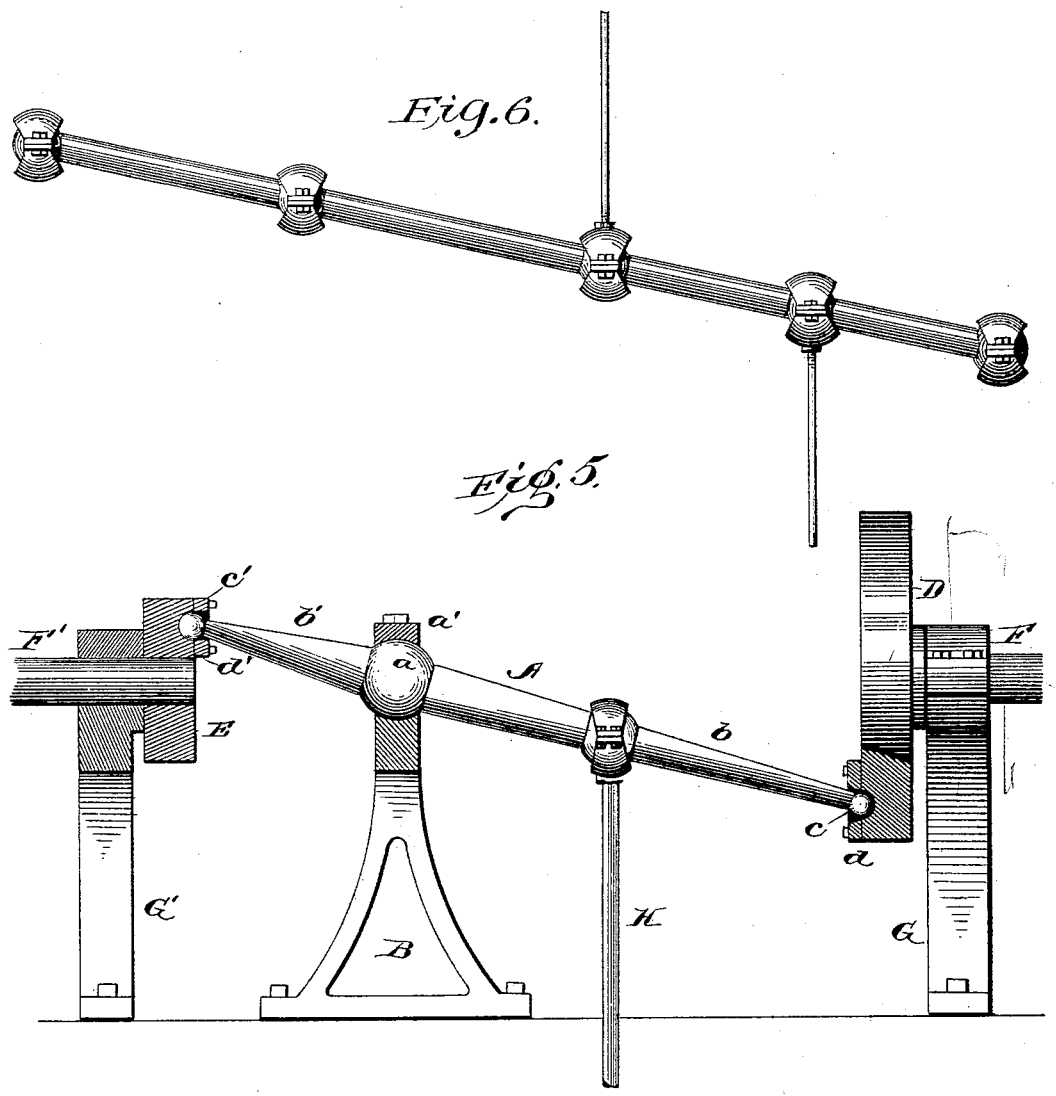
Witnesses:
J. M. Fowler Jr.
Walter B. Payne.
Inventor:
Augustus Howard,
by Henry H. Bates,
Attorney.
THE NORRIS PETERS CO., PHOTO-LITHO., WASHINGTON, D. C.

UNITED STATES PATENT OFFICE.

AUGUSTUS HOWARD, OF SAN FRANCISCO, CALIFORNIA, ASSIGNOR TO WILLARD REED GREEN, OF DENVER, COLORADO.

MECHANICAL MOVEMENT.

SPECIFICATION forming part of Letters Patent No. 616,333, dated December 20, 1898.

Application filed June 13, 1898. Serial No. 683,350. (No model.)

*To all whom it may concern:*

Be it known that I, AUGUSTUS HOWARD, a subject of the Queen of Great Britain, residing at San Francisco, in the county of San Francisco and State of California, have invented certain new and useful Improvements in Mechanical Movements; and I do hereby declare the following to be a full, clear, and exact description of the invention, such as will enable others skilled in the art to which it appertains to make and use the same.

My invention relates to improved mechanism for the transmission of mechanical motion.

It is useful for many purposes and may serve the function of a crank in many cases.

One of the objects of the invention is to provide mechanism offering a minimum of friction with connecting parts and which may, as to itself, follow the lines of least resistance; also, to provide means to serve the purposes for which it is suitable at reduced cost.

The invention consists, primarily, of a peculiar form of lever, of any suitable material and dimensions, the bearings of which at all movable or frictional points consist of balls and sockets or their equivalents, said balls being either integral with the lever or attached thereto, as may be mechanically most convenient. Said balls may also be made to rotate on said lever when found desirable. Other balls may be attached or located at any point on the lever-arms, as the occasion demands.

Figure 1:
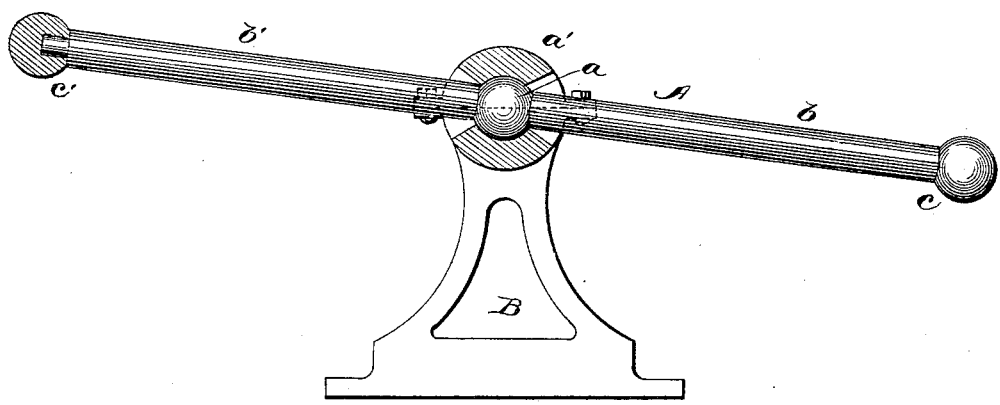
Figure 2:
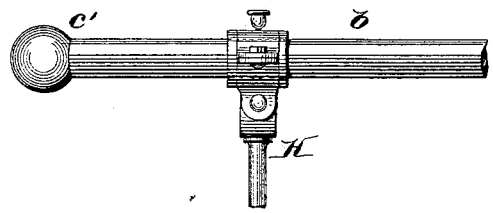
Figure 3:
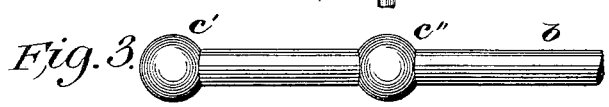
Figure 4:
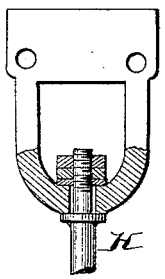

In the drawings forming a part of this specification, Figure 1 is an elevation showing the principal features of my device and one form of arranging them. Fig. 2 is a detailed view of one extremity of the lever A, shown in Fig. 1, showing one form of universal-joint attachment to serve as a connection to transmit motion from some source of power. Fig. 3 is a detailed view of one end of the lever A, shown in Fig. 1, showing the ball $c'$ upon the extremity of said lever and the ball $c''$ placed between the fulcrum and said extremity to serve as means for a ball-and-socket connection. Fig. 4 is a detailed view, enlarged, of a portion of the universal-joint connection shown in Fig. 2. Fig. 5 is an elevation, partly in section, showing the mechanism in one of its operative applications. Fig. 6 is an elevation showing the mechanism in one of its operative applications and with connections for different sources of power.

Like letters of reference indicate like parts.

In the drawings, A is a lever fulcrumed at $a$ on a fixed pedestal B. Said fulcrum allows movement to the lever in any direction by means of the ball-and-socket joint $a\ a'$, which permits the lever-arms to describe cones of revolution of which the apexes are the center of the ball-fulcrum.

$b\ b'$ are the arms of the lever, which may be equal or may have any ratio of desired inequality. $c\ c'$ are the extremities of said lever-arms and are equipped with means for engagement with any rotative part with which it is desired to form motive connection in such manner that the juncture shall have free motion in every direction and be capable of transmitting the movement of the lever to such rotating parts and also of receiving motion from a rotating piece of machinery and transmitting it through the lever to another motive element.

In transmitting rotary motion from one rotative element to another mounted on rotary shafting in axial alinement, as illustrated in Fig. 5, the axis of the lever moves in the figure of two cones whose apexes are at the center of the ball-fulcrum and whose extremities describe circles whose diameters are in the same ratio as the lever-arms. These lever-arms are provided at the extremities, as before stated, with means for making a universal-joint connection with the respective rotative elements, which are in this case disk wheels D E, borne on rotary shafts F F', supported in suitable bearings. Said means of connection, as shown, are ball-and-socket joints, the balls being formed on or attached to the lever-arms, respectively, and the sockets being formed in or secured to the faces of the rotative wheels $d\ d'$, as shown being perforated plates attached by bolts or otherwise over the ball-sockets for greater security of the joint. Now, the two shafts being thus united by the intermediary lever, it follows that any movement of revolution imparted to the lever at any point between its fulcrum and either of the rotative elements D E will be communicated to said rotative elements similarly as when a crank intervenes. Where the lever is used in place of the crank of a single engine, the power is applied between the fulcrum and the ball connected with the rotative disk of the engine-shaft.

I have shown in Fig. 2 a form of universal-joint connection which may on occasion take the place of the ball-and-socket connection, though I consider the latter preferable for most situations. The said universal joint, which has a movement on the lever-arm by a strap limited at each side by collars and also a swivel connection with the connecting-rod H, will be sufficiently well understood without further explanation.

While I have shown and specifically described certain embodiments of my invention, it is evident that the details of construction and arrangement may be varied to suit the circumstances of use without departing from the general principles of the invention. It will readily be seen that where the device is used in place of an ordinary crank connecting two rotary shafts the throw may be in any ratio with that of the delivery-points of the lever, dependent on the distance of the connecting-joint of the source of power from the fulcrum.

Several advantages over the ordinary crank for transmitting rotary motion are apparent. First, the crank is a difficult and costly form to construct and when of large size is often liable to accidents. Second, the crank-pin being often forged entire presents a difficulty in making a secure rotary attachment thereto, so as to take up and compensate for wear, which at this point is excessive. The wear, moreover, is always in annular lines, and the journal-bearings may become striated in consequence where the friction is excessive. In the lever the movement of the ball in its bearing is not continuously rotary over the same lines, but partakes of an oscillatory conjoined with a rotary movement, which distributes the wear over a considerable spherical surface in lines which cross each other and tend to keep both ball and socket truly spherical. By the spread of the lubricant over a comparatively large surface and at a relatively slower speed the coefficient of friction is reduced.

There is also a decided advantage in first cost over the crank. The lever is a straight piece of shafting, and the bearings can be truly and accurately made by machinery. The crank, as before said, is often a cumbrous and difficult piece of forging. The lever also is susceptible of connection without structural change to reciprocating motors having different ranges of movement. All that is necessary in case a different throw of piston is demanded is to make the ball-and-socket connection at a different point of the lever-arm, the ball-fulcrum and the terminal connection remaining the same. Also two or more connecting-rods from different sources of power may be connected to the same lever-shaft at the respective distances from the fulcrum called for by their respective lengths of stroke. These connecting-rods may come in from any direction so that they are in the plane of rotation, the fulcrum being supposed to be fixed and immovable on its pedestal.

Saving of weight in the saving of heavy shafting is also an element of advantage, the lever being capable of being extended in either direction from the fulcrum to considerable distances to meet the rotating members, where a crank would require shafting up to the source of motion.

An advantage also arises in the use of this mode of transmitting motion in the fact that the lever, being borne at all points of contact by joints free to turn independently in any direction and degree, does not rotate upon its own axis continuously in one direction, as does the crank pin and shaft, but oscillates in a small arc with a small progressive rotation, by which the wear is equably distributed and less friction is produced.

It is evident that when the device is used in place of a crank the operative end of the lever may describe a larger circle than that described by the lever at the point where the connecting-rod of the motive power is attached, thus giving a greater throw at the delivery-point than the length of travel of the piston itself.

I claim and desire to secure by Letters Patent—

1. A mechanical movement, consisting of a lever, having a ball-and-socket fulcrum-bearing and means for making universal-joint connections with rotative bodies operatively connected with said lever, and said rotative bodies.

2. A mechanical movement, consisting of a lever having spherically-terminated ends and an intermediate spherical fulcrum, in combination with spherical sockets on rotative parts in coöperation with said terminals, and a ball-socket for the fulcrum, and said rotative bodies, substantially as specified.

3. In a mechanical movement, a lever having a ball-and-socket fulcrum, ball-and-socket terminal connections, and ball-and-socket connections at intermediate points, by which attachment may be made to different sources of power with different ranges of movement, and rotative elements connected to the terminals of said lever.

4. A mechanical movement, consisting of a lever, all the movable bearing or frictional points of which are balls, suitable for making ball-and-socket joints, in combination with rotative bodies having sockets operatively connected therewith, whereby said lever is permitted to transmit revolution to or from revoluble parts while independently rotating freely on its own axis.

5. A mechanical movement, consisting of a lever, all the movable bearing or friction points of which are balls, in combination with one or more revoluble bodies having sockets connected with said balls, and means operatively connected with a source of motive power, as an engine, whereby revolution is transmitted to said revoluble bodies from said power through the medium of said lever while permitting said lever to rotate independently on its own axis.

6. In a mechanical movement, a lever having ball-and-socket terminals, a ball-and-socket fulcrum, said terminals and fulcrum being in alinement and a ball-and-socket connection at an intermediate point for the attachment of parts designed either for the transmission or for the reception of power, substantially as specified.

In testimony whereof I affix my signature in presence of two witnesses.

AUGUSTUS HOWARD.

Witnesses:
WALTER B. PAYNE,
ALEXANDER S. STEUART.